(12) United States Patent
Onuma et al.

(10) Patent No.: US 7,165,966 B2
(45) Date of Patent: Jan. 23, 2007

(54) INJECTION MOLDING MACHINE

(75) Inventors: Hiroyuki Onuma, Mishima (JP);
Katsuhito Ogura, Numazu (JP);
Katsuyoshi Kido, Numazu (JP);
Harumichi Tokuyama, Odawara (JP)

(73) Assignee: Toshiba Kikai Kabushiki Kaisha, Tokyo-To (JP)

( * ) Notice: Subject to any disclaimer, the term of this patent is extended or adjusted under 35 U.S.C. 154(b) by 249 days.

(21) Appl. No.: 10/448,226

(22) Filed: May 30, 2003

(65) Prior Publication Data

US 2003/0224085 A1 Dec. 4, 2003

(30) Foreign Application Priority Data

May 31, 2002 (JP) .............................. 2002-159647

(51) Int. Cl.
*B29B 11/06* (2006.01)
(52) U.S. Cl. ...................... 425/550; 425/145; 425/149; 408/142
(58) Field of Classification Search ................ 408/142; 425/145, 550, 149; 296/26.05
See application file for complete search history.

(56) References Cited

U.S. PATENT DOCUMENTS

| | | | | |
|---|---|---|---|---|
| 4,500,274 A | * | 2/1985 | Cyriax et al. | 425/185 |
| 4,529,371 A | * | 7/1985 | Nickley | 425/186 |
| 4,695,237 A | * | 9/1987 | Inaba | 425/135 |
| 4,735,564 A | * | 4/1988 | Sasaki et al. | 425/145 |
| 4,886,439 A | * | 12/1989 | Hehl | 425/190 |
| 4,895,505 A | * | 1/1990 | Inaba et al. | 425/145 |
| 4,984,980 A | * | 1/1991 | Ueno | 425/595 |
| 4,988,273 A | * | 1/1991 | Faig et al. | 425/145 |

(Continued)

FOREIGN PATENT DOCUMENTS

JP 61019326 A * 1/1986

*Primary Examiner*—Robert Davis
*Assistant Examiner*—G. Nagesh Rao
(74) *Attorney, Agent, or Firm*—Pillsbury Winthrop Shaw Pittman LLP

(57) ABSTRACT

There is provided an injection molding machine provided with an injection mechanism that enables a high-speed injection.

The injection molding machine includes: a heating barrel for melting and kneading a resin fed from a hopper, said barrel having an injection nozzle at its front end; a screw movably and rotatably inserted in the heating barrel; a screw drive shaft coupled at its one end to the rear end of the screw; charging means including a charging motor for rotationally driving the screw drive shaft to rotate the screw so as to melt the resin in the heating barrel while conveying the resin forward of the screw, and measure the volume of the molten resin, and torque transmission means for transmitting the driving torque of the charging motor to the screw drive shaft and permitting a displacement of the screw drive shaft in the axial direction; a body frame fixing and supporting the charging motor and the torque transmission means, said frame including a front plate fixing and supporting the base of the heating barrel; injection drive means including a linear-movement shaft coupled to the rear end of the screw drive shaft and movable in the axial direction, and an injection motor for advancing the screw and producing an injection force for injecting the molten resin in the heating barrel; and shaft coupling means for coupling the rear end of the screw drive shaft to the linear-movement shaft such that only a thrust in the axial direction is transmitted to the screw drive shaft.

9 Claims, 5 Drawing Sheets

U.S. PATENT DOCUMENTS

| | | |
|---|---|---|
| 5,014,767 A * | 5/1991 | Ueno .......................... 164/312 |
| 6,368,095 B1 * | 4/2002 | Chang ........................ 425/145 |
| 6,443,722 B1 * | 9/2002 | Castelli et al. .............. 425/145 |
| 6,490,956 B1 * | 12/2002 | Takeishi et al. ............ 83/437.4 |
| 6,793,477 B2 * | 9/2004 | Yoshioka .................... 425/150 |
| 6,821,103 B2 * | 11/2004 | Tokuyama et al. ........... 425/145 |
| 6,866,496 B2 * | 3/2005 | Morita et al. ................ 425/145 |
| 6,916,169 B2 * | 7/2005 | Okada ........................ 425/593 |
| 2001/0041197 A1 * | 11/2001 | Yoshioka .................... 425/149 |
| 2003/0108640 A1 * | 6/2003 | Nishizawa et al. ......... 425/587 |
| 2004/0018270 A1 * | 1/2004 | Becker et al. .............. 425/587 |

* cited by examiner

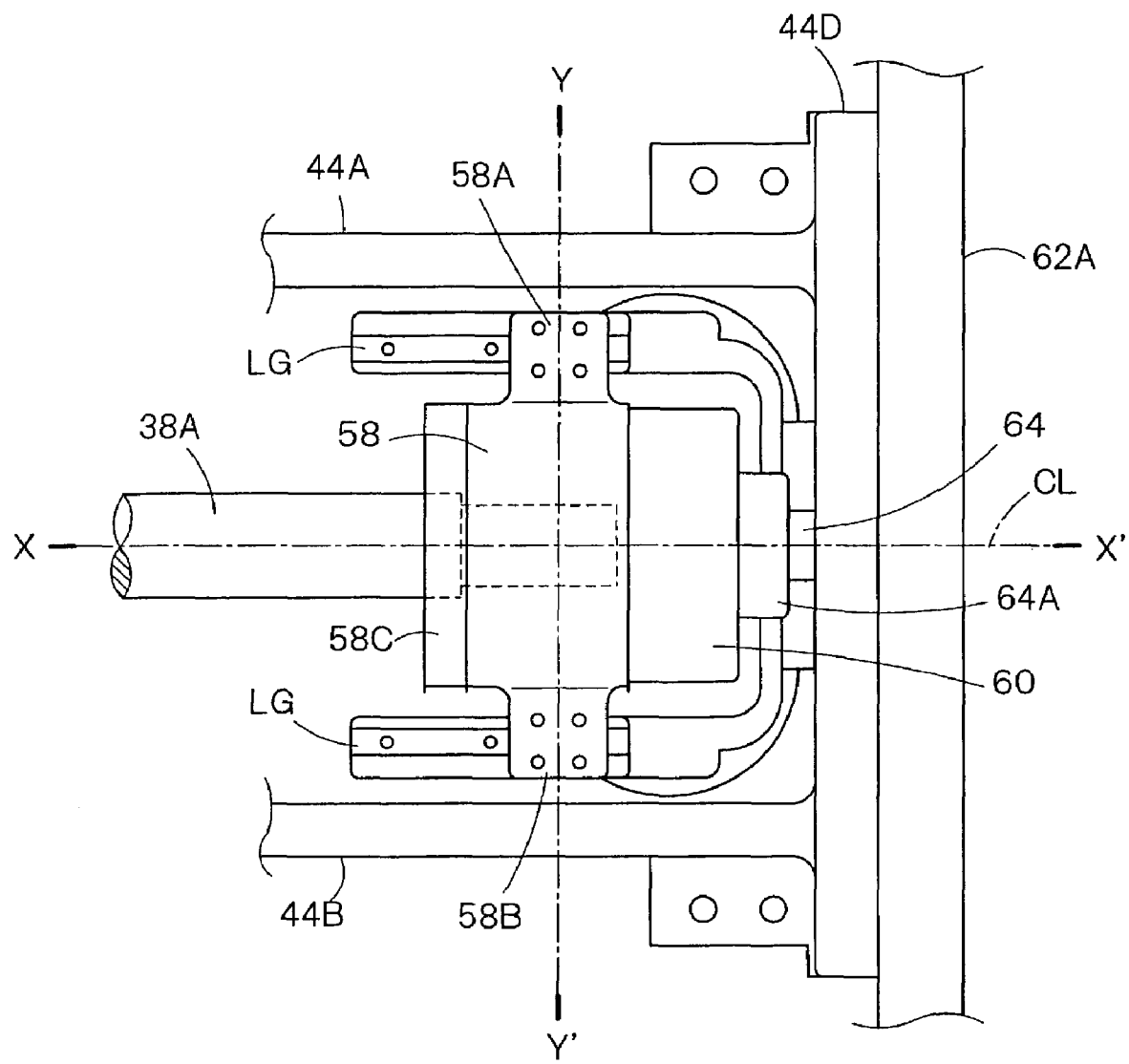
F I G. 2

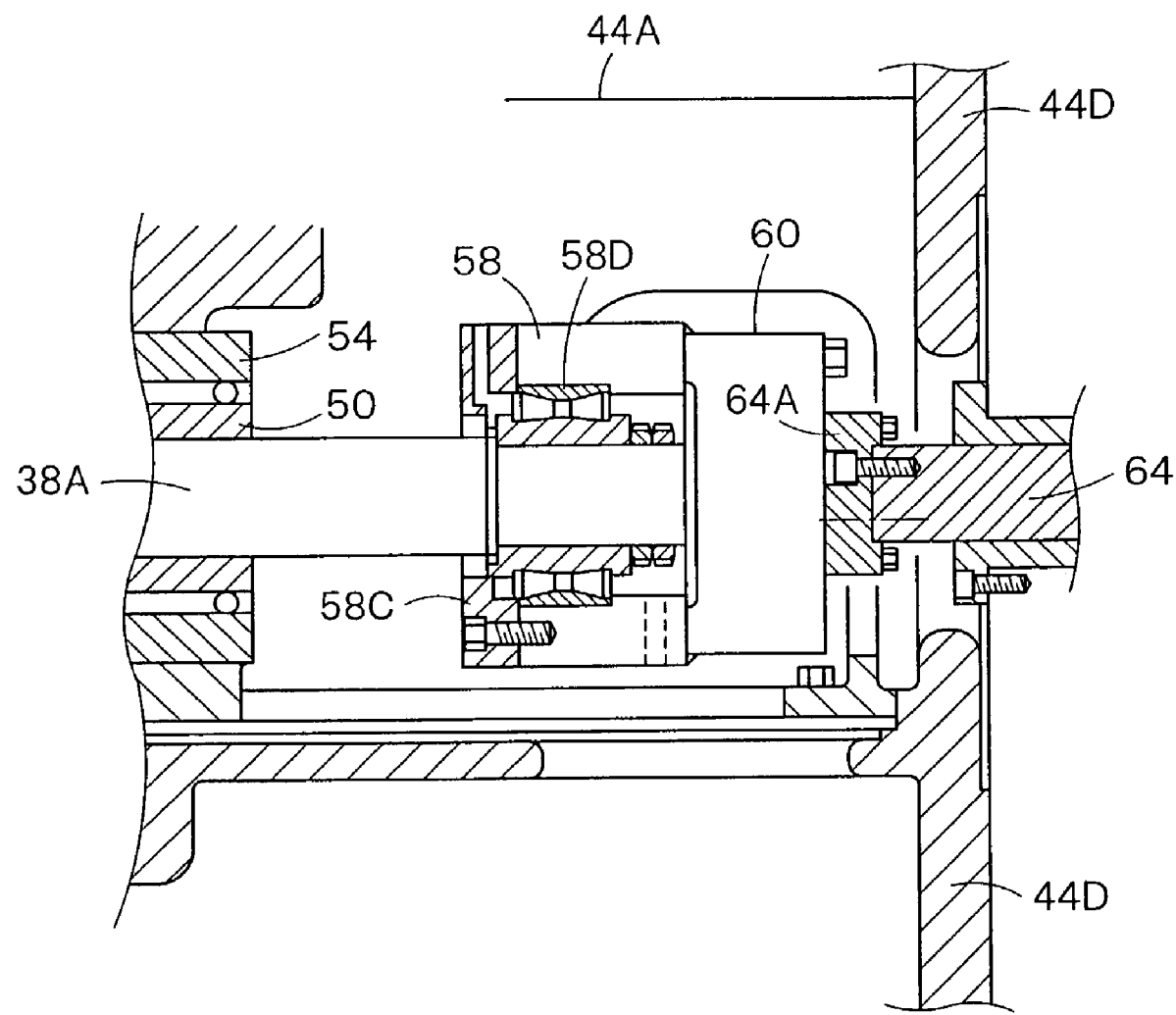
F I G. 4

INJECTION MOLDING MACHINE

CROSS REFERENCE TO RELATED APPLICATIONS

This application claims priority to Japanese application No. 2002-159647, filed May 31, 2002, the contents of which is incorporated herein in its entirety by reference.

BACKGROUND OF THE INVENTION

1. Field of the Invention

The present invention relates to an injection molding machine, and more particularly to an injection unit which enables a high-speed injection.

2. Background Art

FIG. 5 shows a conventional motor-driven injection molding machine. The injection molding machine 1 includes a front plate 3 and a rear plate 4 on a fixed base 2, which plates 3, 4 are coupled to each other by tie bars 5. A barrel 6 is fixed at the base portion to the front plate 3. A screw 7 is housed in the barrel 6. The screw 7 can be driven to rotate by means of a charging motor 8.

The base portion of the screw 7 is rotatably supported, via a bearing 9, by an intermediate plate 10. The intermediate plate 10 and the charging motor 8 can be reciprocated along the tie bars 5 in the direction of arrow A shown in FIG. 5 by means of a linear movement mechanism 13 which includes, for example, a ball screw 11 and a servo motor 12.

According to the injection molding machine 1 of FIG. 5, the intermediate plate 10, the charging motor 8, etc. are moved in the axial direction A together with the screw 7. Thus, the inertia is large as compared to the case of moving only the screw 7. The large inertia due to the concurrent movement of the intermediate plate 7, the motor 8, etc. has been a restriction on a high-speed injection. Further, the charging motor 8 is usually equipped with a not-shown encoder for detecting the number of revolutions of the motor 8. This entails the problem that a high acceleration upon a high-speed injection can damage the encoder.

Further, according to the injection drive mechanism shown in FIG. 5, the intermediate plate 10 moves while it is guided by the four tie bars 5. An error in the parallelism of the bars, between right and left bars or between upper and lower bars, upon assembling of the tie bars would therefore lead to an uneven sliding between the intermediate plate 10 and the tie bars 5, which would act as a resisting force against the injection driving force by the linear movement mechanism 13.

Furthermore, the conventional injection molding machine 1, with the provision of the tie bars 5 for supporting members that make a linear movement, e.g. the intermediate plate 10, can exert a high resistance to a tensile load in the back and forth direction (the A direction shown in FIG. 5). The conventional molding machine, however, has an insufficient rigidity to resist a load in the vertical direction or in the lateral direction (width direction of the machine) which may be caused by, for example, a misalignment from the injection shaft. This problem may be dealt with by making the tie bars 5 thicker. The use of thicker tie bars, however, necessitates an extra space for assembly, requires a larger-sized associated parts and incurs an increased cost.

SUMMARY OF THE INVEVTION

It is therefore an object of the present invention to preclude the above problems in the prior art and provide an injection molding machine provided with an injection mechanism which is free from an inertial load due to an intermediate plate, etc. and which enables a high-speed injection.

It has now been formed by the present inventors that this object can be achieved by not using an intermediate plate nor a tie bar in an injection mechanism, fixing a charging motor and a mechanism for transmitting the rotation of the motor to a screw both to a body frame so that they may not move in the axial direction, and providing a linear guide for guiding the movement of the screw in the axial direction.

Thus, the present invention provides an injection molding machine, comprising: a heating barrel for melting and kneading a resin fed from a hopper, said barrel having an injection nozzle at its front end; a screw movably and rotatably inserted in the heating barrel; a screw drive shaft coupled at its one end to the rear end of the screw; charging means including a charging motor for rotationally driving the screw drive shaft to rotate the screw so as to melt the resin in the heating barrel while feeding the molten resin forward of the screw, and charge the molten resin in front of the screw, and torque transmission means for transmitting the driving torque of the charging motor to the screw drive shaft and permitting a displacement of the screw drive shaft in the axial direction; a body frame fixing and supporting the charging motor and the torque transmission means, said frame including a front plate fixing and supporting the base of the heating barrel; injection drive means including a linear-movement shaft coupled to the rear end of the screw drive shaft and movable in the axial direction, and an injection motor for advancing the screw and producing an injection force for injecting the molten resin in the heating barrel; and shaft coupling means configured to couple the rear end of the screw drive shaft to the linear-movement shaft such that only a thrust in the axial direction is transmitted to the screw drive shaft.

BRIEF DESCRIPTION OF THE DRAWINGS

FIG. 2 is an enlarged plan view of the shaft coupling section and its vicinity of FIG. 1, the shaft coupling portion being designated by arrow Z in FIG. 1;

FIG. 4 is a sectional view taken along the line X–X' of FIG. 2; and

DETAILED DESCRIPTION OF A PREFERRED EMBODIMENT

A preferred embodiment of the present invention will now be described in detail with reference to FIGS. 1 through 4.

Figure 1:
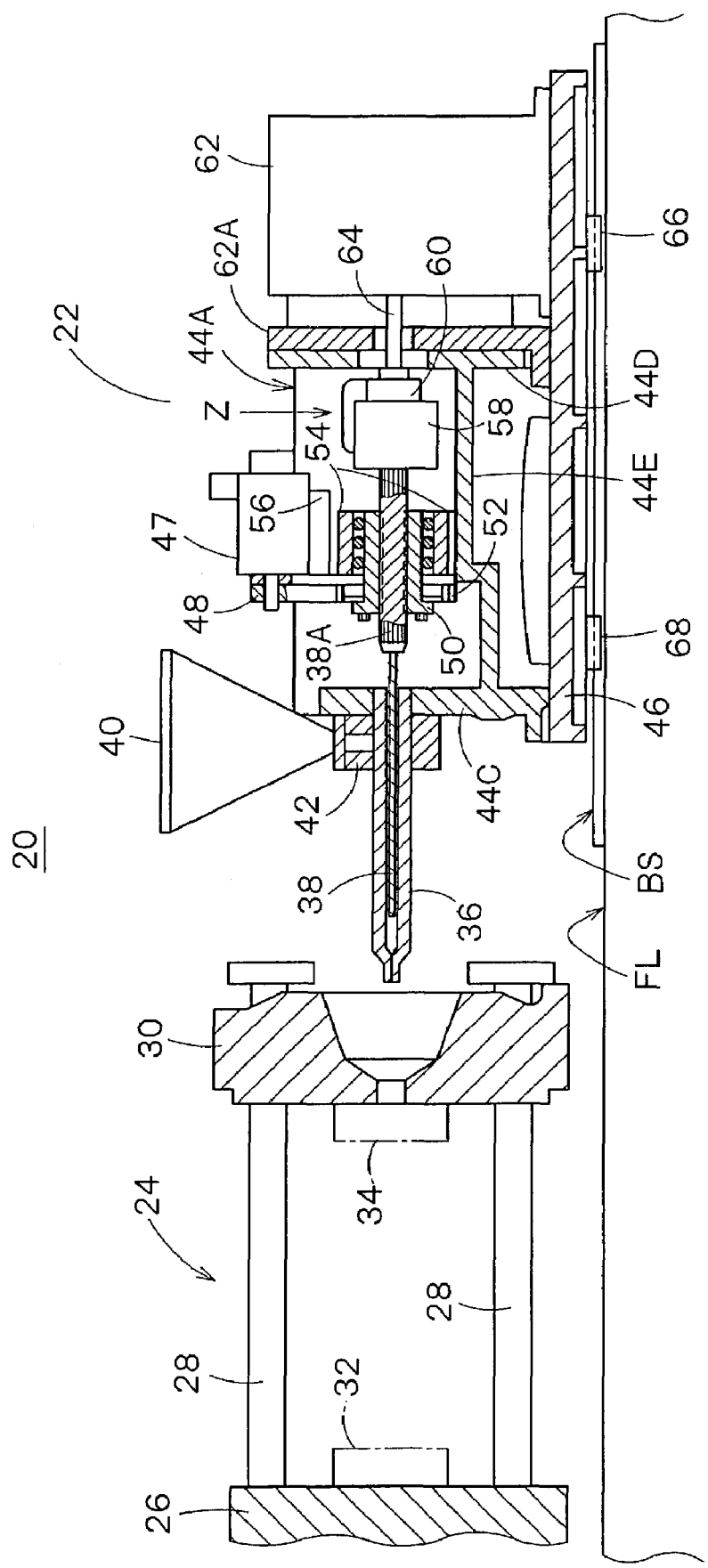
FIG. 1 is a front view of an injection molding machine according to the present invention, as viewed from the operation side.

FIG. 1 shows a front view of an injection molding machine according to the present invention, as viewed from the operation side. In FIG. 1, reference numeral 20 denotes the injection molding machine, which is comprised of an injection unit 22 and a mold clamping unit 24 that is shown schematically. The mold clamping unit 24 includes a movable die plate 26 to which a movable mold 32 is mounted and a fixed die plate 30 to which a fixed mold 34 is mounted, which are opposed to each other and coupled by tie bars 28.

The injection unit 22 is installed on a base BS, which is fixed on a concrete floor FL, via linear sliders 66, 68 that are mounted to the lower surface of a bottom plate 46. The linear sliders 66, 68 are slidably disposed on the base BS, and can move the bottom plate 46 right and left via a not-shown nozzle touch driving mechanism. Further, the bottom plate 46 can be turned by means of a not-shown turning mechanism. Upon a change of a screw 38, the axial direction of the screw 38 is changed by the turn of the bottom plate 46 so that the screw can be withdrawn from a heating barrel 36.

A front plate 44C, which constitutes a body frame together with the bottom plate 46, is mounted vertically on the left end of the bottom plate 46, and supports the base of the heating barrel 36.

Reference numeral 40 denotes a hopper for retaining a resin in a pellet form. The hopper 40 communicates with the upper end of a resin introduction inlet 42 which is mounted to the outer circumference of a base portion of the heating barrel 36. The screw 38 is inserted in the heating barrel 36, and the other end of the screw 38 is concentrically coupled and fixed to the left end of a spline shaft 38A. A spline nut 50 of a predetermined length is in engagement with the outer circumference of the spline shaft 38A, and the left end of the spline nut 50 is fixed by bolts to a pulley 52. The outer circumference of the spline nut 50 is rotatably supported by a bearing 54. The bearing 54 is fixed and supported on a horizontal wall 44E constituting the body frame.

Reference numeral 47 denotes a charging motor with an encoder coupled to its rotating shaft. The charging motor 47 is fixed and supported on a support table 56 extending laterally from the inner surface of a side wall 44A constituting the body frame. A pulley 48 is fixed to the output shaft of the charging motor 47, and a timing belt extends between the pulley 48 and the pulley 52.

Accordingly, when the charging motor 47 is rotated, the spline shaft 38A is rotated via the pulley 48, the pulley 52 and the spline nut 50. The charging motor 47, the pulley 48, the pulley 52, the timing belt, the spline nut 50 and the bearing 54 constitute a charging mechanism according to the present invention.

A linear drive unit 62 is disposed on the right end of the bottom plate 46. The linear drive unit 62 is a drive mechanism that utilizes a conventional linear motor. A linear-movement shaft 64, which is the output shaft of the linear drive unit 62, penetrates a vertical frame 62A and passes through a through-hole formed in a rear plate 44D constituting the body frame, and is connected to a shaft coupling section 58.

Figure 3:
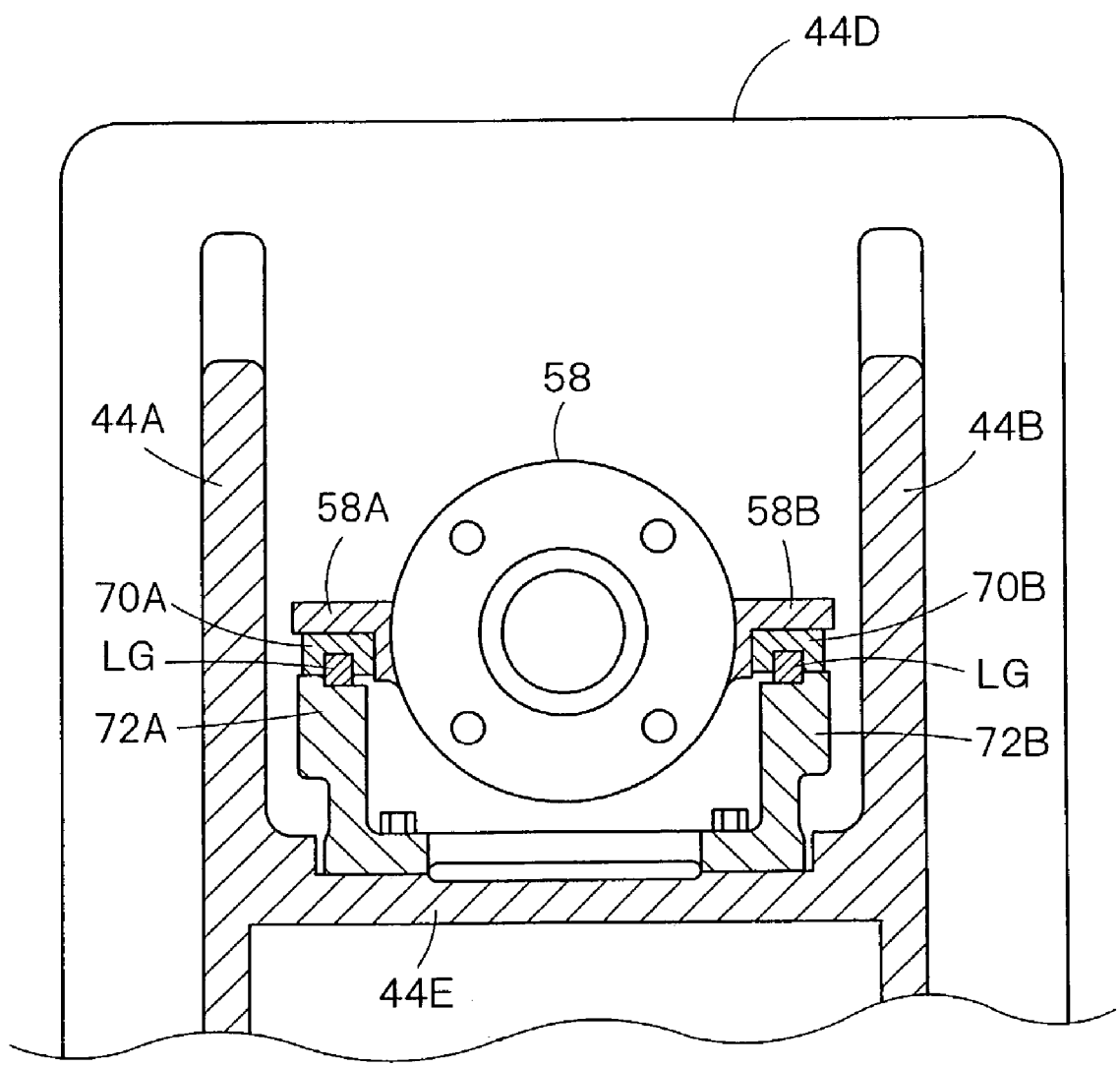
FIG. 3 is a sectional view taken along the line Y–Y' of FIG. 2.

FIG. 2 is an enlarged plan view of the shaft coupling section 58 and its vicinity, the shaft coupling portion being designated by arrow Z in FIG. 1. As shown in FIG. 2, the shaft coupling section 58 is disposed in the space defined by the side walls 44A, 44B and the rear plate 47D which are mounted vertically on the bottom plate 46. The right end of the spline shaft 38A penetrates a lid 58C and intrudes into the shaft coupling section 58, where the spline shaft 38A is rotatably supported. On the other hand, on the right of the shaft coupling section 58, the front end of the linear-movement shaft 64 is fixed to a coupling member 64A, and the coupling member 64A is coupled to a load cell 60 as a load detection means. The load cell 60 is mounted to the right end surface of the shaft coupling section 58 concentrically with the spline shaft 38A. Reference numerals 58A, 58B denote brims which, as shown in FIG. 3, are disposed generally at the axial height and extend from the outer circumference of the shaft coupling section 58 toward the side walls 44A, 44B, respectively. A pair of linear guides LG is disposed right below the brims 58A, 58B in parallel with a center line CL.

FIG. 3 shows a sectional view taken along the line Y–Y' of FIG. 2. As shown in FIG. 3, linear rollers 70A, 70B are mounted to the lower surfaces of the brims 58A, 58B, and are each in contact with the upper surface and the side surfaces of each linear guide LG. The linear guides LG are mounted on the surfaces of guide support frames 72A, 72B which are mounted vertically on the horizontal wall 44E. As shown in FIG. 3, the height of the upper surfaces of the linear guides LG is generally equal to the height of the central axis of the shaft coupling section 58. Also as shown in FIG. 3, the mass distribution of the shaft coupling section 58 is generally symmetric with respect to the center line CL both vertically and laterally.

FIG. 4 is a sectional view taken along the line X–X' of FIG. 2. As shown in FIG. 4, a bearing 58D is provided inside the shaft coupling section 58, and the right end portion of the spline shaft 38A is rotatably supported by the bearing 58D. A lubricating oil passage for supplying a lubricating oil to the bearing 58D is formed in the lid 58C and the shaft coupling section 58. As shown in FIG. 4, the coupling member 64A is fastened by bolts to the right end surface of the load cell 60, and is also fasten by bolts to the left end surface of the linear-movement shaft 64. It is preferred that the linear-movement shaft 64 and the spline shaft 38A be assembled such that their central axes best coincide.

The operation of the injection apparatus of this embodiment, which has the above-described construction, will now be described below.

A description is first given of the operation in a charging process. When the charging motor 47 is energized, the driving torque is transmitted from the pulley 48 to the spline nut 50 via the timing belt and the pulley 52. The spline nut 50, while rotating, transmits the driving torque to the spline shaft 38A whereby the screw 38, coupled to the spline shaft 38A, is rotated. A resin material, which has been fed from the hopper 40 into the heating barrel 36, is melted by heat from a not-shown heater and by the shear heat generated by the rotation of the screw 38 while the molten resin is conveyed forward of the screw 38, and the volume of the molten resin thus accumulated is measured. On the other hand, the screw 38 is forced to move backward (rightward in FIG. 1) by the pressure of the molten resin being accumulated in front of the screw.

With the backward movement of the screw 38, the spline shaft 38A is also moved backward while it is rotated because of its spline engagement with the spline nut 50. The back pressure applied to the screw 38 is transmitted from the spline shaft 38A to the linear-movement shaft 64 via the load cell 60. During the movement of the screw 38, the linear motor of the linear drive section is controlled so that the back pressure load may be kept at a predetermined value. While the screw 38 is moving, the shaft coupling section 58 is guided by the linear guides LG.

The operation in an injection process will now be described. The charging motor 47 is not employed in an injection process. When the linear motor of the linear drive unit 62 is energized, the linear-movement shaft 64 advances at a high speed, and the thrust is transmitted, via the shaft coupling section 58 and the load cell 60, to the spline shaft 38A. As a result, the screw 38 advances (leftward in FIG. 1) and injects the molten resin, accumulated in front of the screw 38, through the injection nozzle.

Upon a high-speed injection, the spline shaft 38A does not rotate, but only slides through the spline nut 50. Accordingly, the charging mechanism does not act as an inertial load on the linear drive section. Further, the shaft coupling section 58 is precisely guided by the linear guides LG.

Figure 5:
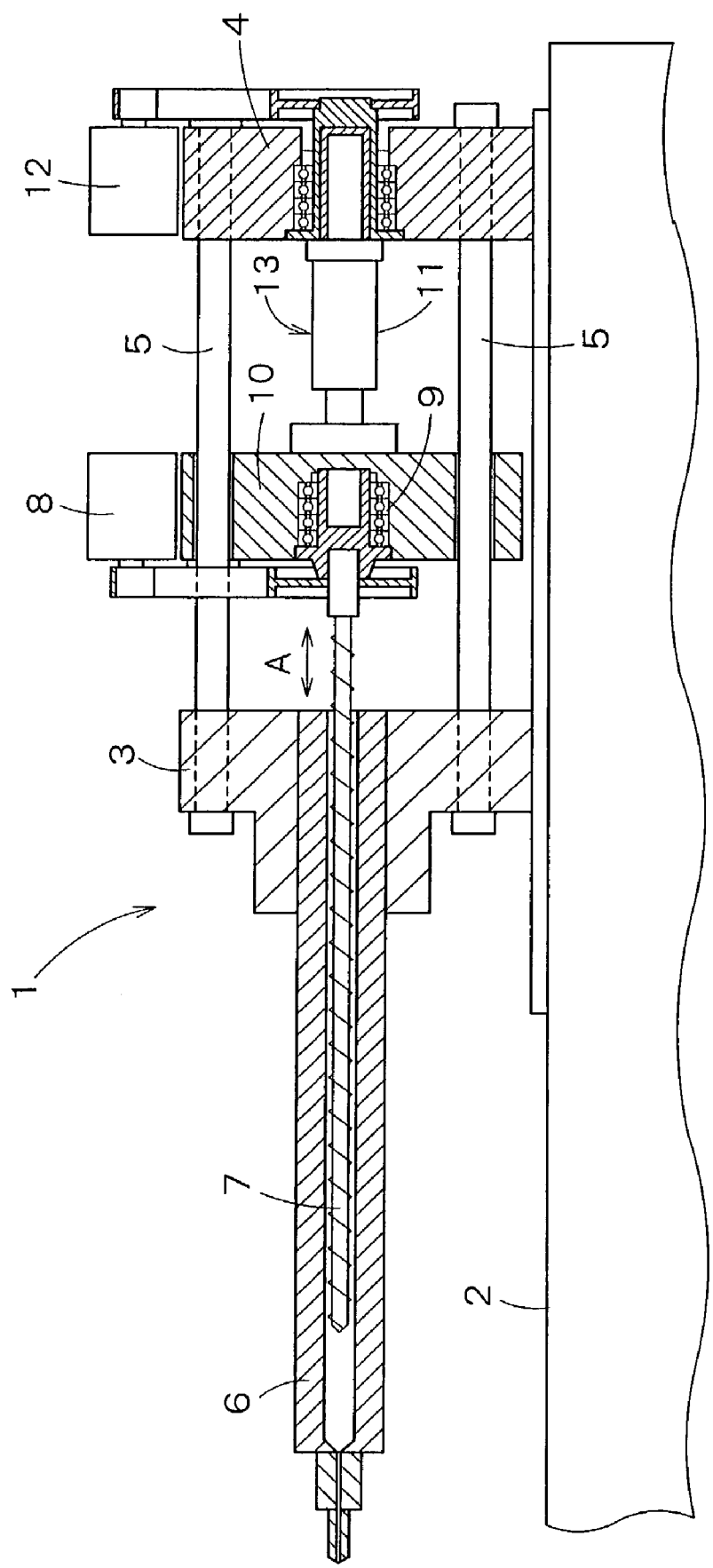
FIG. 5 is a front view of a conventional motor-driven injection molding machine, as viewed from the operation side.

While the present invention has been described with reference to the preferred embodiment thereof, it will be appreciated by those skilled in the art that charges and modifications could be make to the embodiment without departing from the spirit and scope of the present invention. For example, according to the above-described embodiment, the left end surface of the linear-movement shaft 64 is fastened by bolts to the coupling member 64A, as shown in FIG. 4. However, it is possible to provide the linear-movement shaft 64 and the coupling member 64A with such coupling surfaces that they make a spherical contact with each other so that only an axial component of driving force can be transmitted from the linear-movement shaft 64 to the coupling member 64A, especially in case it is difficult to adjust with high precision a misalignment from the linear guide of the linear drive unit 62 and the pair of linear guides LG supporting the shaft coupling section 58. Further, instead of the linear motor system employed in the linear drive section 62, it is possible to use a system in which a rotational movement of a servo motor is converted into a linear movement of a ball screw, as employed in the conventional machine shown in FIG. 5, or a linear drive system in which a servo valve and a hydraulic cylinder are used in combination. Furthermore, it is possible to use, instead of the load cell 60, a load detection means which directly detects the back pressure of a molten resin at the front end of the heating barrel 36.

As described hereinabove, according to the present invention, the charging mechanism does not act as an inertial load on the linear drive section upon a high-speed injection. The shaft coupling section is so constructed that its mass distribution is generally symmetrical with respect to the central axis both vertically and horizontally. Further, the shaft coupling section is guided by the linear guide at generally the same height as the axis of the screw. Accordingly, the injection driving force from the linear drive section acts on the axis of the screw without producing an offset load even when a high-speed injection is carried out. This makes it possible to move the screw precisely even when a high acceleration is applied to the screw upon a high-speed injection.

What is claimed is:

1. An injection molding machine, comprising:
    a heating barrel for melting and kneading a resin fed from a hopper, said barrel having an injection nozzle at its front end;
    a screw movably and rotatably inserted in the heating barrel;
    a screw drive shaft coupled at its one end to the rear end of the screw;
    charging means including a charging motor for rotationally driving the screw drive shaft to rotate the screw so as to melt the resin in the heating barrel while feeding the molten resin forward of the screw, and charging the molten resin in front of the screw, and torque transmission means for transmitting the driving torque of the charging motor to the screw drive shaft and permitting a displacement of the screw drive shaft in the axial direction;
    a body frame fixing and supporting the charging motor and the torque transmission means, said frame including a front plate fixing and supporting the base of the heating barrel;
    injection drive means including a linear-movement shaft for transmitting an injection force to the screw drive shaft and movable in the axial direction, and an injection motor for advancing the linear-movement shaft and producing the injection force for injecting the molten resin in the heating barrel;
    shaft coupling means having a bearing to support rotatably for coupling the rear end of the screw drive shaft to the front end of the linear-movement shaft such that only a thrust in the axial direction is transmitted to the screw drive shaft; and
    a pair of linear guides for supporting both lateral sides of the shaft coupling means so that the shaft coupling means is allowed to move in the axial direction, said linear guides are positioned generally at the same height as the central axis of the screw drive shaft.

2. The injection molding machine according to claim 1, wherein the screw drive shaft has a spline shaft which has a central axis coincident with the central axis of the linear-movement shaft.

3. The injection molding machine according to claim 2, wherein the torque transmission means comprises a spline nut engaging the spline of the screw drive shaft and rotatably supported by a bearing, a pulley that rotates together with the spline nut, the charging motor, and a timing belt for transmitting the rotation of an output shaft of the charging motor to the pulley.

4. The injection molding machine according to claim 1, wherein the linear guides are disposed generally symmetrically with respect to the central axis of the screw drive shaft.

5. The injection molding machine according to claim 1 further comprising load detection means for detecting a load applied to the screw in the axial direction due to the back pressure of the molten resin in the heating barrel.

6. The injection molding machine according to claim 5, wherein the load detection means comprises a load cell interposed between the shaft coupling means and the linear-movement shaft.

7. The injection molding machine according to claim 1, wherein the body frame is of an integral structure composed of a bottom plate, the front plate fixing and supporting the base of the heating barrel, a rear plate opposed to the front plate and having a through-hole for the linear-movement shaft, and side walls holding the charging means and vertically disposed on both sides thereof.

8. The injection molding machine according to claim 1, wherein the injection motor is a linear motor.

9. An injection molding machine, comprising:
    a heating barrel for melting and kneading a resin fed from a hopper, said barrel having an injection nozzle at its front end;
    a screw movably and rotatably inserted in the heating barrel;
    a screw drive shaft coupled at its one end to the rear end of the screw;
    charging means including a charging motor for rotationally driving the screw drive shaft to rotate the screw so as to melt the resin in the heating barrel while feeding the molten resin forward of the screw, and charging the molten resin in front of the screw, and torque transmission means for transmitting the driving torque of the charging motor to the screw drive shaft and permitting a displacement of the screw drive shaft in the axial direction;
    a stationary body frame for carrying the weight of the charging motor and the torque transmission means, mounted fixedly on a machine base, said body frame is of an integral structure composed of a bottom plate, a front place for fixing and supporting the base of the heating barrel, a rear plate opposed to the front plate and having a through-hole for the linear-movement shaft and side walls holding the charging means and vertically disposed on both sides thereof;

injection drive means including a linear-movement shaft for transmitting an injection force to the screw drive shaft and movable in the axial direction, and an injection motor for advancing the linear-movement shaft and producing the injection force for injecting the molten resin in the heating barrel; and a shaft coupling means having a bearing to support rotatably for coupling the rear end of the screw drive shaft to the front end of the linear-movement shaft such that only a thrust in the axial direction is transmitted to the screw drive shaft.

* * * * *